US012728834B2

(12) United States Patent
Patel et al.

(10) Patent No.: US 12,728,834 B2
(45) Date of Patent: Sep. 8, 2026

(54) ELECTRIC MACHINE SHIFT AND ENGINE START COORDINATION

(71) Applicant: FCA US LLC, Auburn Hills, MI (US)

(72) Inventors: Nadirsh D Patel, Farmington Hills, MI (US); Cristian Rostiti, Sterling Heights, MI (US); Allwyn D Bhakare, South Woodslee (CA); Paolo Olivieri, Pecetto Torineze (IT)

(73) Assignee: FCA US LLC, Auburn Hills, MI (US)

( * ) Notice: Subject to any disclaimer, the term of this patent is extended or adjusted under 35 U.S.C. 154(b) by 306 days.

(21) Appl. No.: 18/522,442

(22) Filed: Nov. 29, 2023

(65) Prior Publication Data

US 2025/0171009 A1 May 29, 2025

(51) Int. Cl.
*B60W 20/15* (2016.01)
*B60K 6/442* (2007.10)
(Continued)

(52) U.S. Cl.
CPC ............ *B60W 20/15* (2016.01); *B60K 6/442* (2013.01); *B60K 6/547* (2013.01); *B60W 10/06* (2013.01);
(Continued)

(58) Field of Classification Search
CPC ...... B60W 20/15; B60W 10/06; B60W 10/08; B60W 10/113; B60W 20/20; B60W 2510/081; B60W 2510/1005; B60W 2520/10; B60W 2540/10; B60W 2710/06; B60W 30/19; B60W 2510/0657; B60W 2510/083; B60W 20/30; B60W 2710/1005; B60W 20/40; B60W 10/02; B60K 6/442; B60K 6/547; B60K 6/387; B60K 2006/4825; B60K 6/48; F02N 11/04; F16H 59/44; F16H 59/70; F16H 61/0403; F16H 61/688; F16H 2059/366; F16H 2059/706; B60Y 2200/92; Y02T 10/62
See application file for complete search history.

(56) References Cited

U.S. PATENT DOCUMENTS

| | | | |
|---|---|---|---|
| 8,469,585 | B2 | 6/2013 | Hong et al. |
| 9,714,027 | B2 | 7/2017 | Yamazaki et al. |

(Continued)

FOREIGN PATENT DOCUMENTS

| | | | |
|---|---|---|---|
| EP | 2931546 | B1 | 1/2017 |

OTHER PUBLICATIONS

International Search Report and Written Opinion dated Mar. 26, 2025 for International Application No. PCT/US2024/057366, International Filing Date Nov. 26, 2024.

*Primary Examiner* — Anne Marie Antonucci
*Assistant Examiner* — Patrick Daniel Mohl
(74) *Attorney, Agent, or Firm* — Jeremy J. Klobucar

(57) ABSTRACT

A hybrid electric vehicle (HEV) includes an internal combustion engine, an electric traction motor, a motor/generator configured to start the internal combustion engine, a transmission, and a powertrain control system including a controller having one or more processors. The controller is programmed to monitor the transmission for a gear shift while the HEV operates in an EV mode where the electric traction motor provides propulsion for the HEV, detect a driver torque request during the gear shift, and turn the internal combustion engine on to provide torque to the HEV during the gear shift.

18 Claims, 2 Drawing Sheets

(51) Int. Cl.

| | |
|---|---|
| ***B60K 6/547*** | (2007.10) |
| ***B60W 10/06*** | (2006.01) |
| ***B60W 10/08*** | (2006.01) |
| ***B60W 10/113*** | (2012.01) |
| ***B60W 20/20*** | (2016.01) |
| ***F02N 11/04*** | (2006.01) |
| ***F16H 59/44*** | (2006.01) |
| ***F16H 59/70*** | (2006.01) |
| ***F16H 61/04*** | (2006.01) |
| ***F16H 61/688*** | (2006.01) |
| *F16H 59/36* | (2006.01) |

(52) U.S. Cl.

CPC .......... *B60W 10/08* (2013.01); *B60W 10/113* (2013.01); *B60W 20/20* (2013.01); *F02N 11/04* (2013.01); *F16H 59/44* (2013.01); *F16H 59/70* (2013.01); *F16H 61/0403* (2013.01); *F16H 61/688* (2013.01); *B60W 2510/081* (2013.01); *B60W 2510/1005* (2013.01); *B60W 2520/10* (2013.01); *B60W 2540/10* (2013.01); *B60W 2710/06* (2013.01); *B60Y 2200/92* (2013.01); *F16H 2059/366* (2013.01); *F16H 2059/706* (2013.01)

(56) References Cited

U.S. PATENT DOCUMENTS

| | | | | |
|---|---|---|---|---|
| 10,207,696 | B2 | 2/2019 | Nefcy et al. | |
| 2013/0074732 | A1* | 3/2013 | Retamal .................. | B01F 35/92 366/279 |
| 2015/0353068 | A1* | 12/2015 | Nefcy ................... | B60W 10/02 701/55 |
| 2016/0046282 | A1* | 2/2016 | Yamazaki ............. | B60W 20/40 180/65.265 |
| 2016/0375891 | A1* | 12/2016 | Bouchon ................ | B60W 10/11 477/5 |
| 2022/0080821 | A1* | 3/2022 | Etzel .................... | B60W 10/113 |

* cited by examiner

ELECTRIC MACHINE SHIFT AND ENGINE START COORDINATION

FIELD

The present application relates generally to hybrid vehicle control systems and, more particularly, to a hybrid powertrain control system to coordinate electric motor gear shift and engine starts.

BACKGROUND

A hybrid-electric vehicle (HEV) powertrain typically includes an internal combustion engine, one or more electric motors, and a transmission. To initiate a transmission gear change when the electric motor is providing torque to the wheels, the motor must first be de-loaded by reducing the torque it applies to the wheels. Once the load is removed, the electric motor is disconnected from the geartrain, and then accelerated or decelerated in order to synchronize to the speed of the target gear. Once the speed is matched, the motor is then connected to the drivetrain to again provide torque to the wheels. However, during this gear change, a driver will feel a "dead pedal" as no torque is delivered to the wheels despite driver actions on the accelerator pedal. Accordingly, while such conventional systems work well for their intended purpose, there is a desire for improvement in the relevant art.

SUMMARY

In accordance with one example aspect of the invention, a hybrid electric vehicle (HEV) is provided. In one example implementation, the HEV includes an internal combustion engine, an electric traction motor, a motor/generator configured to start the internal combustion engine, a transmission, and a powertrain control system including a controller having one or more processors. The controller is programmed to monitor the transmission for a gear shift while the HEV operates in an EV mode where the electric traction motor provides propulsion for the HEV, detect a driver torque request during the gear shift, and turn the internal combustion engine on to provide torque to the HEV during the gear shift.

In addition to the foregoing, the described HEV may include one or more of the following features: wherein the transmission is a hybrid dual clutch transmission; wherein the transmission includes a first clutch, a second clutch, a first sub-transmission, and a second sub-transmission; wherein the gear shift occurs on the second sub-transmission, and the internal combustion engine provides the torque to the first sub-transmission during the gear shift; wherein the first sub-transmission includes odd gears, and the second sub-transmission includes even gears; and wherein the controller is further programmed to prevent engine-on during the gear shift if a speed of the HEV is below a predetermined threshold speed.

In addition to the foregoing, the described HEV may include one or more of the following features: wherein the controller is further programmed to determine a synchronization ratio that indicates how far into a synchronization phase the gear shift is; wherein if the synchronization ratio is greater than a predetermined threshold, the controller completes the gear shift without turning the internal combustion engine on, and wherein if the synchronization ratio is less than the predetermined threshold, the controller turns the internal combustion engine on to provide the torque to the HEV during the gear shift; and wherein the synchronization ratio is determined by the equation $$\text{ratio} = \frac{N_{current} - N_{start}}{N_{target} - N_{start}},$$

where $N_{current}$ is a current speed of the electric traction motor, $N_{start}$ is a speed of a starting gear of the gear shift, and $N_{target}$ is a speed of a target gear of the gear shift.

In accordance with another example aspect of the invention, a method of operating a hybrid electric vehicle (HEV) having an internal combustion engine, an electric traction motor, a motor/generator, and a transmission is provided. In one example implementation, the method includes monitoring, by a controller having one or more processors, the transmission for a gear shift while the HEV operates in an EV mode where the electric traction motor provides propulsion for the HEV; detecting, by the controller, a driver torque request during the gear shift; and turning the internal combustion engine on, by the controller, to provide torque to the HEV during the gear shift.

In addition to the foregoing, the described method may include one or more of the following features: wherein the transmission is a hybrid dual clutch transmission; wherein the transmission includes a first clutch, a second clutch, a first sub-transmission, and a second sub-transmission; wherein the gear shift occurs on the second sub-transmission, and the internal combustion engine provides the torque to the first sub-transmission during the gear shift; wherein the first sub-transmission includes odd gears, and the second sub-transmission includes even gears; and preventing engine-on, by the controller, during the gear shift if a speed of the HEV is below a predetermined threshold speed.

In addition to the foregoing, the described method may include one or more of the following features: determining, by the controller, a synchronization ratio that indicates how far into a synchronization phase the gear shift is; wherein if the synchronization ratio is greater than a predetermined threshold, the controller completes the gear shift without turning the internal combustion engine on, and wherein if the synchronization ratio is less than the predetermined threshold, the controller turns the internal combustion engine on to provide the torque to the HEV during the gear shift; and wherein the synchronization ratio is determined by the equation $$\text{ratio} = \frac{N_{current} - N_{start}}{N_{target} - N_{start}},$$

where $N_{current}$ is a current speed of the electric traction motor, $N_{start}$ is a speed of a starting gear of the gear shift, and $N_{target}$ is a speed of a target gear of the gear shift.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
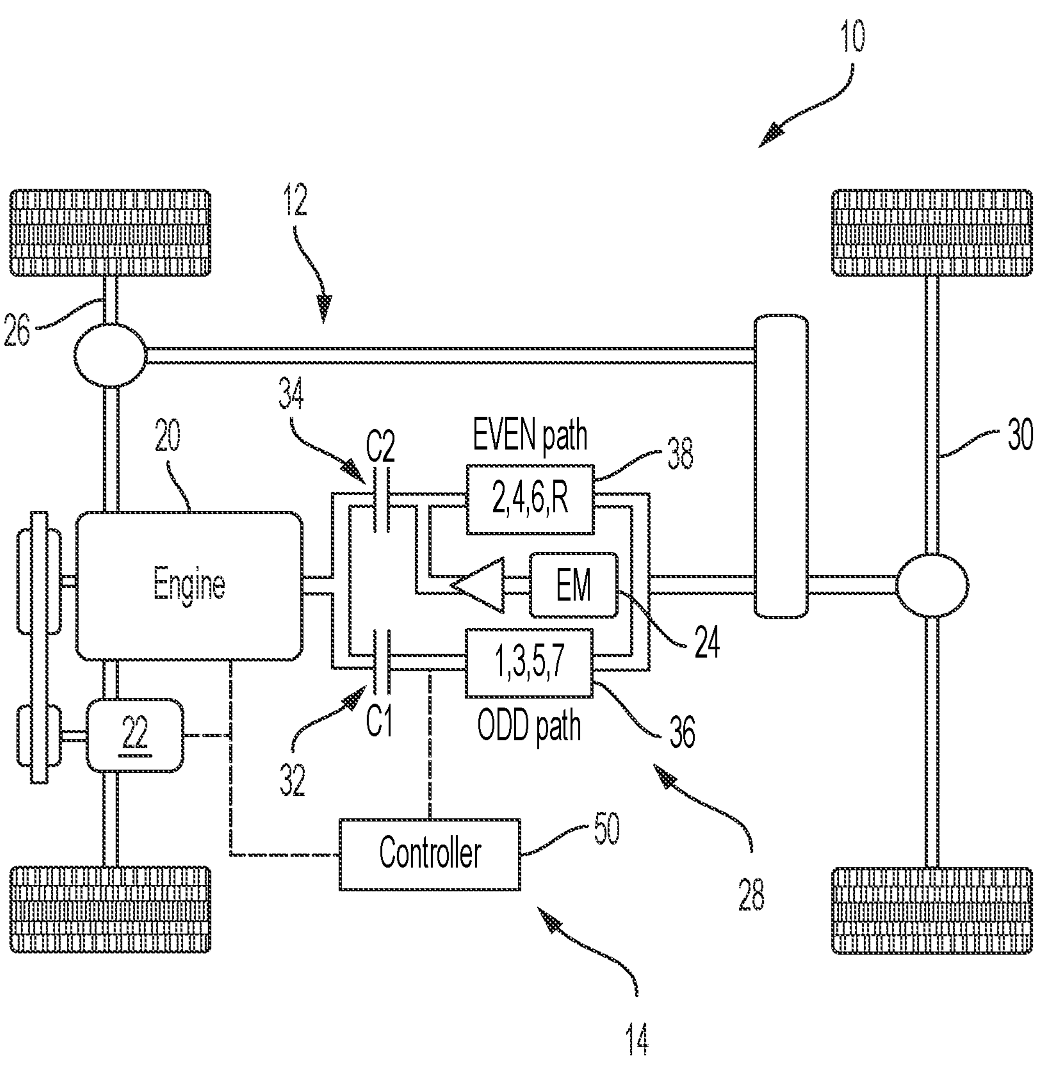
FIG. 1 is a schematic illustration of an example hybrid electric vehicle (HEV) architecture in accordance with the principles of the present application.

As discussed above, the process to change an electric machine gear in a hybrid electric vehicle (HEV) powertrain requires several steps. When the HEV is driving in an electric mode, the electric machine or electric motor (EM) provides torque to the vehicle wheels. The first step is to de-load the EM by reducing the torque it applies to the wheels. Second, once the load is removed, the EM is disconnected from the geartrain. The EM is then accelerated or decelerated in order to synchronize to the speed of the target gear. The third step, once the speed is matched, is to connect the EM to the drivetrain to again provide torque to the wheels. However, during this gear change, there is a significant amount of time where the EM is incapable of producing torque, commonly referred to as a torque hole.

When a driver requests acceleration during the gear change, the powertrain control can either ignore the torque hole and wait for the shift to be completed before being able to provide torque through the EM, or abort the shift and perform a change of mind by returning to the initial gear based upon which stage of the shift the driver demand comes in and then let the EM provide the requested torque. However, ignoring the torque hole can potentially impact the driver experience, and aborting the shift still requires a wait time before being able to provide torque again.

Accordingly, described herein is a hybrid powertrain control system configured to coordinate electric motor gear shift and engine starts with a first gear path (for the EM) and second gear path (for the engine). The system leverages engine torque to deliver driver torque demand during an electric motor gear shift. For example, during a shift, the control system checks for a driver torque request. If the torque rises above a predetermined threshold, the engine is activated to deliver the torque to the wheels using the second gear path.

To avoid false starts, engine-on is enabled only when the EM shift is at the beginning stage. If the shift is almost concluded, the EM will soon be able to provide the desired torque, possibly faster than turning on the engine. This condition is checked by looking at which phase the EM shift is in, either de-loading or synchronization. The system utilizes the current EM speed, the starting gear, and the target gear to determine a synchronization ratio that indicates how far into the synchronization phase the EM shift is. This allows for better timing for the enabling of the engine start condition.

Additionally, a driver torque request (during the gear shift) can be compared to a predetermined torque threshold and used as a function of current vehicle speed to adjust the system behavior, for example, during parking maneuvers at low speed, where engine start may not be desirable. As such, the system reduces drivability concerns during electric motor gear shifts while in EV mode by requesting engine start to support the driver torque demand. This allows the electric motor gear shift while providing the driver requested torque with minimal impact on drivability and vehicle responsiveness. Moreover, the control logic estimates the status of the electric motor gear shift based on relative speed differences to thereby minimize engine start events and requests them only when support is beneficial for drivability.

With initial reference to FIG. 1, a schematic diagram of a hybrid electric vehicle (HEV) 10 is illustrated having a hybrid powertrain 12 and a powertrain control system 14 according to example implementations of the disclosure. In the illustrated example, the powertrain 12 generally includes an internal combustion engine 20 and two electric motors, including a motor/generator 22 (e.g., P1 motor), and a high voltage electric traction motor/generator 24 (e.g., P2 motor).

The engine 20 combusts a mixture of air and fuel (e.g., gasoline) within cylinders to drive pistons and generate drive torque to a front axle 26 via a transmission 28. The motor/generator 22 is utilized to control engine stop/start operations to improve vehicle fuel economy or produce electricity to charge a high voltage battery (not shown), and the P2 electric traction motor/generator 24 is configured to selectively provide drive torque to the front axle 26 and/or a rear axle 30.

In the example embodiment, the transmission 28 is a hybrid dual clutch transmission that generally includes a first clutch 32, a second clutch 34, a first sub-transmission 36 with odd gears (e.g., 1, 3, 5, 7 . . . ), and a second sub-transmission 38 with even gears (e.g., 2, 4, 6, 8 . . . ). The first and second clutches 32, 34 are transmission clutches that allow engagement between the engine 20, electric motor/generator 24, and the rest of the transmission 28. The "even" path represents the even gears of the transmission 28, typically used when the electric motor/generator 24 is the element providing propulsion (e.g., EV mode). The "odd" path represents the odd gears of the transmission 28, typically used when the engine 20 is the element providing propulsion. As such, the hybrid powertrain 12 has electric gears (even path) for the electric motor/generator 24 to provide torque, and a secondary path (odd gears) for the engine 20 to provide torque without the need for the electric motor/generator 24 to be engaged. It will be appreciated, however, that transmission 28 may have any suitable configuration that enables HEV 10 to function as described herein.

In the example embodiment, the hybrid powertrain 12 is controlled by the powertrain control system 14, which generally includes a hybrid control processor (HCP) or controller 50 in signal communication with various other components such as, for example, a DC/DC converter, an auxiliary power module (APM), the motor/generator 22, etc. The controller 50 is a central supervisory control configured to communicate with the various components/modules of the hybrid powertrain 12.

The motor/generator 22 is an actuator configured to be utilized as a starter when the HEV 10 needs to crank the engine 20. The motor/generator 22 is also configured to operate in an alternator mode to charge one or more batteries and support low voltage loads while the engine 20 is running. The motor/generator 22 can be directly controlled by a motor control processor (not shown), which is a controller configured for bi-directional communication with the controller 50. The controller 50 is configured to control the motor/generator 22 by forwarding signals, such as operation state, torque command, and voltage setpoints to the motor control processor.

In operation, the powertrain control system 14 is configured to determine if the engine 20 should be turned on during an electric motor gear shift to meet a driver torque demand such that the driver does not experience a dead pedal (torque hole) during the gear shift. In one example operation, the powertrain control system 14 monitors the powertrain 12 to detect an electric motor gear shift, for example, via a signal/flag to the controller 50. To perform the gear shift, the powertrain control system 14 de-loads the electric motor/generator 24 and disengages the second clutch 34 to stop torque delivery to the second sub-transmission 38. The electric motor/generator 24 is then accelerated or decelerated in order to synchronize to the speed of the target gear (the gear the transmission is shifting to). When the electric motor speed is matched to the target gear speed, powertrain control system 14 re-engages the second clutch 34 to again provide torque to the second sub-transmission 38 to drive the vehicle wheels.

During the gear shift, the powertrain control system 14 determines a synchronization ratio for the gear shift utilizing the equation $$\text{ratio} = \frac{N_{current} - N_{start}}{N_{target} - N_{start}},$$

where $N_{current}$ is the current speed of the electric motor/generator 24, $N_{start}$ is the speed of the starting gear, and $N_{target}$ is the speed of the target gear. The determined ratio identifies how far into the gear shift the transmission currently is, which enables the powertrain control system 14 to determine whether or not the engine 20 should be turned on if there is a driver torque request. A higher ratio indicates that the electric motor/generator 24 is close to its final speed and will soon be able to provide driver torque. The ratio may be constantly determined throughout the gear shift or may only be determined when the driver torque request is detected.

The powertrain control system 14 then compares the determined ratio to a calibratable, predetermined threshold that indicates if there is still enough time left in the gear shift to turn the engine on and deliver the requested torque. If the determined ratio is above the predetermined threshold, there is not enough time left in the shift to deliver torque via engine 20, and the powertrain control system 14 completes the gear shift without turning engine 20 on. However, if the determined ratio is below the predetermined threshold, the powertrain control system 14 turns engine 20 on and engages first clutch 32 to deliver torque to the first sub-transmission 36 to drive the vehicle wheels. In some embodiments, once the gear shift for electric motor/generator 24 is completed, powertrain control system 14 may turn engine 20 off and disengage the first clutch 32.

As such, the powertrain control system 14 only performs an engine start when driver torque request occurs at a time that is far from the electric gear synchronization. Additionally, the engine start may only be performed when the driver torque request is above a predetermined threshold, which can be a function of vehicle speed and other powertrain conditions. Further, powertrain control system 14 may include a debouncing logic to prevent false starts of the engine. The debouncing logic is configured to confirm the driver is actually requesting torque and the accelerator pedal was not accidentally pressed. During the gear shift, the powertrain control system 14 may also prevent or disable engine-on if certain conditions occur such as, for example, the vehicle speed is below a predetermined threshold.

Figure 2:
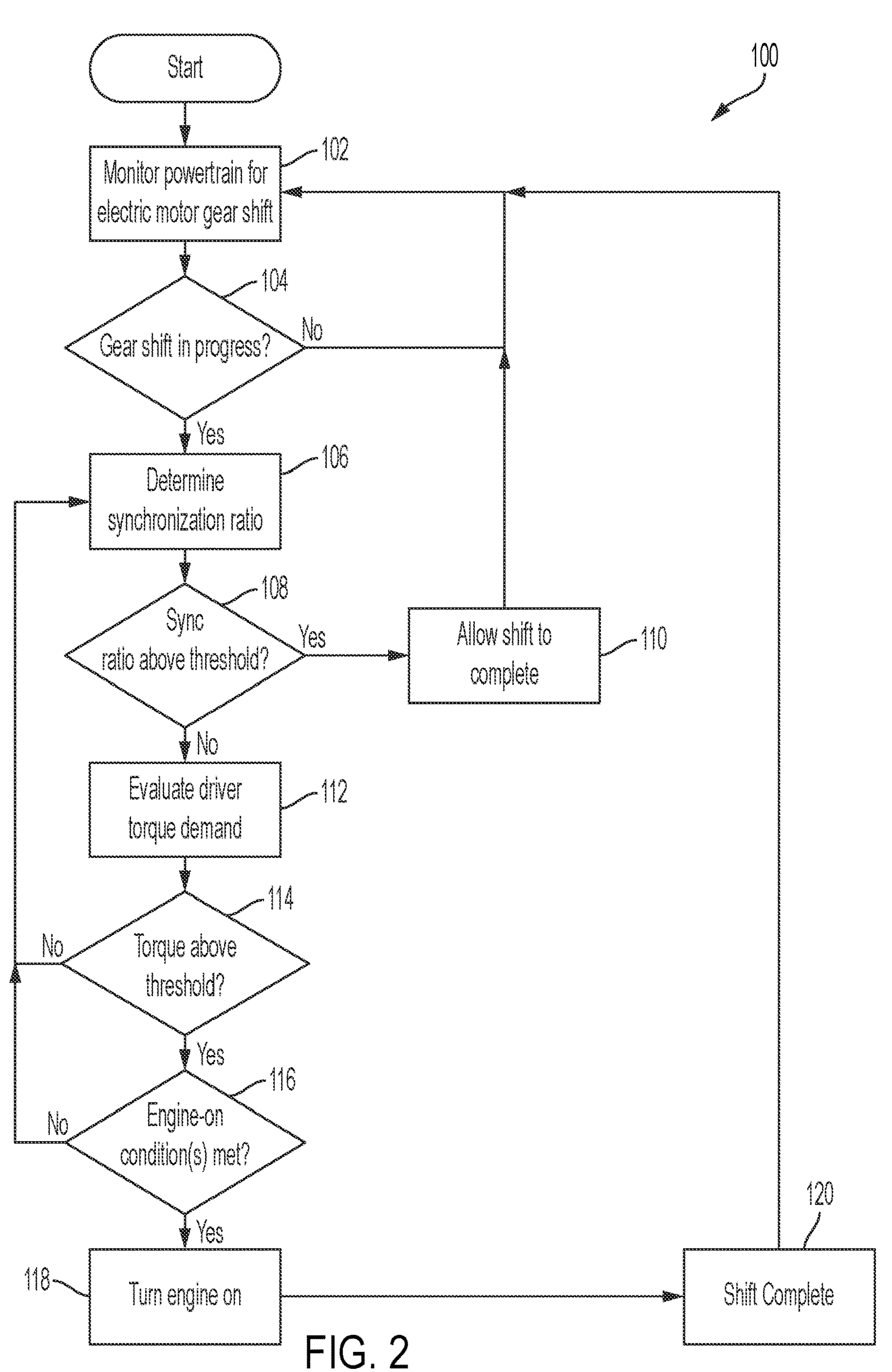
FIG. 2 illustrates an example control logic flow for determining an engine start demand within an electric gear shift for the HEV shown in FIG. 1, in accordance with the principles of the present application.

With reference now to FIG. 2, an example control logic flow 100 for operating the powertrain control system 14 during an electric gear shift is provided. At step 102, control (e.g., controller 50) monitors the powertrain 12 to detect an electric motor gear shift. At step 104, control determines if an electric motor gear shift is in progress. If no, control returns to step 102. If yes, at step 106, control determines a synchronization ratio that indicates how far into the gear shift the system is. At step 108, control compares the determined synchronization ratio to a predetermined threshold ratio indicating if there is still enough time left in the gear shift to turn the engine on and deliver torque before the gear shift is completed. If the synchronization ratio is above the predetermined threshold ratio, control proceeds to step 110 and allows the gear shift to complete without turning engine 20 on. Control then returns to step 102.

If the synchronization ratio is below the predetermined threshold ratio, control proceeds to step 112 and evaluates a driver torque demand. At step 114, control determines if the driver torque demand is above a predetermined torque demand threshold. If the driver torque demand is below the predetermined threshold (including no driver torque demand), control returns to step 106. If the driver torque demand is above the predetermined threshold, control proceeds to step 116 and determines if one or more conditions are met for an engine-on condition. Example conditions include if the vehicle is above a predetermined speed. If the conditions are not met, control returns to step 106. If the conditions are met, control proceeds to step 118 and commands the engine 20 to turn on and engages the first clutch 32 to deliver torque to the first sub-transmission 36 and vehicle wheels. At step 120, the electric motor gear shift is completed, and control may then end or return to step 102.

Described herein are systems and methods for determining whether an internal combustion engine should be turned on during an electric motor gear shift to prevent a torque hole when a driver torque request occurs during the gear shift. The system monitors the gear shift and determines a synchronization ratio that indicates how far into the gear shift the transmission is. If the ratio is below a predetermined threshold ratio, the system turns the engine on to provide torque to the vehicle during the electric motor gear shift.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:
- an internal combustion engine;
- an electric traction motor;
- a motor/generator configured to start the internal combustion engine;
- a transmission; and
- a powertrain control system including a controller having one or more processors, the controller programmed to:
  - monitor the transmission for a gear shift while the HEV operates in an EV mode where the electric traction motor provides propulsion for the HEV;
  - detect a driver torque request during the gear shift; and
  - in response, turn the internal combustion engine on to provide torque to the HEV to satisfy the driver torque request during the gear shift.

2. The HEV of claim 1, wherein the transmission is a hybrid dual clutch transmission.

3. The HEV of claim 2, wherein the transmission includes a first clutch, a second clutch, a first sub-transmission, and a second sub-transmission.

4. The HEV of claim 3, wherein the gear shift occurs on the second sub-transmission, and the internal combustion engine provides the torque to the first sub-transmission during the gear shift.

5. The HEV of claim 3, wherein the first sub-transmission includes odd gears, and the second sub-transmission includes even gears.

6. The HEV of claim 1, wherein the controller is further programmed to determine a synchronization ratio that indicates how far into a synchronization phase the gear shift is.

7. The HEV of claim 6, wherein if the synchronization ratio is greater than a predetermined threshold, the controller completes the gear shift without turning the internal combustion engine on, and
- wherein if the synchronization ratio is less than the predetermined threshold, the controller turns the internal combustion engine on to provide the torque to the HEV during the gear shift.

8. The HEV of claim 6, wherein the synchronization ratio is determined by the equation:

$$\text{ratio} = \frac{N_{current} - N_{start}}{N_{target} - N_{start}},$$

where $N_{current}$ is a current speed of the electric traction motor, $N_{start}$ is a speed of a starting gear of the gear shift, and $N_{target}$ is a speed of a target gear of the gear shift.

9. The HEV of claim 1, wherein the controller is further programmed to prevent engine-on during the gear shift if a speed of the HEV is below a predetermined threshold speed.

10. A method of operating a hybrid electric vehicle (HEV) having an internal combustion engine, an electric traction motor, a motor/generator, and a transmission, the method comprising:
- monitoring, by a controller having one or more processors, the transmission for a gear shift while the HEV operates in an EV mode where the electric traction motor provides propulsion for the HEV;
- detecting, by the controller, a driver torque request during the gear shift; and
- in response, turning the internal combustion engine on, by the controller, to provide torque to the HEV to satisfy the driver torque request during the gear shift.

11. The method of claim 10, wherein the transmission is a hybrid dual clutch transmission.

12. The method of claim 11, wherein the transmission includes a first clutch, a second clutch, a first sub-transmission, and a second sub-transmission.

13. The method of claim 12, wherein the gear shift occurs on the second sub-transmission, and the internal combustion engine provides the torque to the first sub-transmission during the gear shift.

14. The method of claim 12, wherein the first sub-transmission includes odd gears, and the second sub-transmission includes even gears.

15. The method of claim 10, further comprising determining, by the controller, a synchronization ratio that indicates how far into a synchronization phase the gear shift is.

16. The method of claim 15, wherein if the synchronization ratio is greater than a predetermined threshold, the controller completes the gear shift without turning the internal combustion engine on, and wherein if the synchronization ratio is less than the predetermined threshold, the controller turns the internal combustion engine on to provide the torque to the HEV during the gear shift.

17. The method of claim 15, wherein the synchronization ratio is determined by the equation:

$$\text{ratio} = \frac{N_{current} - N_{start}}{N_{target} - N_{start}},$$

where $N_{current}$ is a current speed of the electric traction motor, $N_{start}$ is a speed of a starting gear of the gear shift, and $N_{target}$ is a speed of a target gear of the gear shift.

18. The method of claim 10, further comprising preventing engine-on, by the controller, during the gear shift if a speed of the HEV is below a predetermined threshold speed.

* * * * *